US007386134B2

(12) United States Patent
Engelsberg et al.

(10) Patent No.: US 7,386,134 B2
(45) Date of Patent: Jun. 10, 2008

(54) ENTERTAINMENT DEVICE

(75) Inventors: Andreas Engelsberg, Hildesheim (DE); Sven Bauer, Hildesheim (DE); Holger Kussmann, Giesen (DE); Michael Wollborn, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 10/474,046

(22) PCT Filed: Mar. 28, 2002

(86) PCT No.: PCT/DE02/01138

§ 371 (c)(1),
(2), (4) Date: Mar. 30, 2004

(87) PCT Pub. No.: WO02/082698

PCT Pub. Date: Oct. 17, 2002

(65) Prior Publication Data

US 2004/0147241 A1 Jul. 29, 2004

(30) Foreign Application Priority Data

Apr. 4, 2001 (DE) ................................ 101 16 722

(51) Int. Cl.
*H04B 3/00* (2006.01)

(52) U.S. Cl. ......................................... 381/77; 709/217

(58) Field of Classification Search .................. 381/77, 381/79, 80, 82, 86; 709/217–219; 700/94
See application file for complete search history.

(56) References Cited

U.S. PATENT DOCUMENTS

| | | | | |
|---|---|---|---|---|
| 5,231,494 | A | 7/1993 | Wachob | |
| 5,410,344 | A | 4/1995 | Graves et al. | |
| 5,469,206 | A | 11/1995 | Strubbe et al. | |
| 5,857,181 | A | 1/1999 | Augenbraun et al. | |
| 6,081,750 | A | 6/2000 | Hoffberg et al. | |
| 6,725,022 | B1 * | 4/2004 | Clayton et al. | 455/154.1 |
| 6,728,531 | B1 * | 4/2004 | Lee et al. | 455/419 |
| 6,799,201 | B1 * | 9/2004 | Lee et al. | 709/217 |

FOREIGN PATENT DOCUMENTS

| | | |
|---|---|---|
| DE | 4300875 | 7/1994 |
| DE | 19814254 | 10/1998 |
| DE | 19805043 | 8/1999 |
| DE | 199 01 242 | 7/2000 |
| EP | 336650 | 10/1989 |
| EP | 680166 | 11/1995 |
| EP | 935359 | 8/1999 |
| GB | 2258102 | 1/1993 |
| WO | 94/08407 | 4/1994 |
| WO | WO99/43109 | 8/1999 |

* cited by examiner

*Primary Examiner*—Xu Mei
(74) *Attorney, Agent, or Firm*—Kenyon & Kenyon LLP

(57) ABSTRACT

An entertainment device has a control element with which a user may have equivalent data searched for and then played back by the entertainment device. The data currently being played back are examined for characteristic features, so that the search for equivalent data is then possible using these features. In particular, the actuation of the control element may be used to modify a user profile. In addition, it is possible for the data currently being played back to be stored in the entertainment device when the control element is actuated.

20 Claims, 1 Drawing Sheet

ENTERTAINMENT DEVICE

BACKGROUND INFORMATION

It is known that an entertainment device such as a car radio has a processor for processing data to be played back and visual and/or acoustic playback means. These playback means include a display and a speaker or speaker system.

SUMMARY OF THE INVENTION

The entertainment device according to the present invention has the advantage over the related art that it is possible using a control element to search for and have played back data of the same type as the data being played back at the moment using the entertainment device according to the present invention, as long as this function is enabled. It is thus possible, for example, by simply actuating the control element, to search for and play back alternative sports programs at the same time as a current sports program. To accomplish this, the processor of the entertainment device according to the present invention searches for at least one characteristic feature that characterizes the data currently being played back. This may be for example a designation of program type, as already achieved by the known program type (PTY) for car radios, or also a comprehensive data description, for example using MPEG 7. These features may also be determined by analyzing the data being played back, for example audio data. Classical music has very high dynamics, and is therefore distinguishable from other music or from voice.

However, digital radio programs or digital multimedia data have many possibilities for characterizing with a description the data played back. On the basis of this description, which is received for example along with the data being played back, the processor of the entertainment device according to the present invention is able to seek and find essentially similar data. In a motor vehicle in particular, and with radio reception in general, the entertainment device according to the present invention offers the advantage that when a commentary, a song or a newscast or weather report is finished the user does not constantly have to search for new sources in order to find similar subjects. It is possible in the case of news, for example, that one may wish more detailed news or additional news, which is then searched for in particular on the Internet. Designating the control element for example as “Like It” makes intuitive, simple operation possible for a user in order to increase the convenience of using an entertainment device without having to perform complex inputs.

Particularly advantageous is the fact that the processor modifies a user profile using the at least one characteristic feature. That makes it possible to recognize the preferences of a user and to respond to them accordingly. For example, if a user is now interested in having stock market news played back, that is achieved in his user profile by actuating the control element according to the present invention. It is particularly advantageous here that this modification of the user profile is acknowledged by an acoustic and/or visual signal, which significantly simplifies the effort of adapting a user profile. In addition, it makes allowance for the characteristic that wishes and preferences can change quickly, particularly in the case of multimedia data. Hence there is a learning, adaptive user profile.

In addition, it is advantageous that the data that has been found which also has the characteristic feature is played back. This may occur directly by starting to play a data sequence, or by showing a list of comparable data that has been found. In particular, it is possible here that a user profile enables a prioritization, or even a prioritization by the processor itself by evaluating the data that has been found.

Finally, it is also advantageous that the duration or frequency of actuation of the control element according to the present invention determines how long the processor searches for data having the at least one characteristic feature. It is thus left to the user to determine how long the search for comparable data continues.

DETAILED DESCRIPTION

Figure 1:
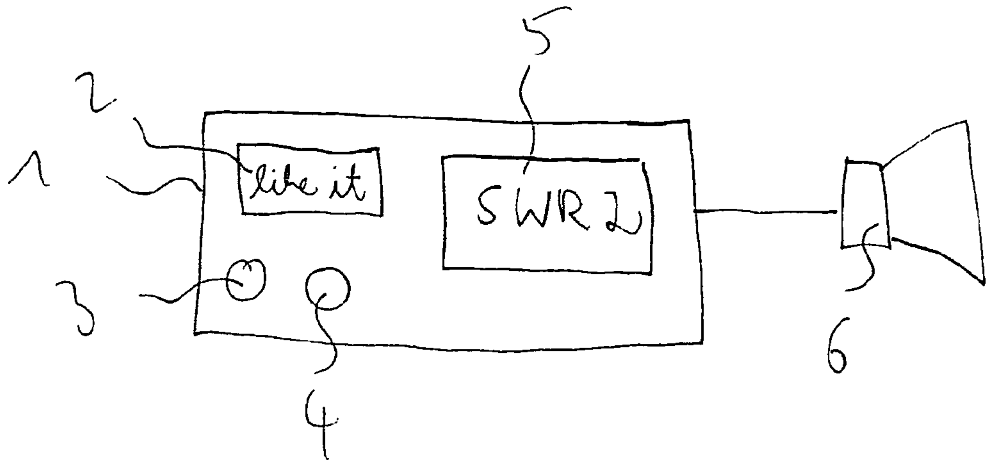
FIG. 1 shows a schematic representation of the entertainment device according to the present invention.

Future vehicles will contain a great number of functionalities that may be retrieved through individual devices or through an infotainment system. In the transitional phase these include analog radio and television receivers (FM, PAL, NTSC), and in the future digital receiving technologies such as DAB (Digital Audio Broadcasting), DMB (Digital Multimedia Broadcasting), DRM (Digital Radio Mondial) and DVB (Digital Video Broadcasting). In addition, almost every motor vehicle will then have a link to a mobile point-to-point communication system such as GSM, GPRS or UMTS. Any desired services are usable via these mobile radio systems, even from the Internet. An incalculable volume of multimedia information and entertainment will then be available in a motor vehicle. This is equally true of home receivers, which are getting a large number, and above all a growing number, of data services. In order to be able to present the driver or a user or a passenger with the information or entertainment in a focused and selective manner, a system of content management is desirable. This includes in part an additional description of the content, and hence an assignment of features, for data to be played back, so that the system knows already when it receives this data what the content is. This description may be transmitted directly along with the data, or it is routed to the system in some desired way, for example via a type of electronic program guide or other additional information. One example of such a system is RDS-PTY (program type code). MPEG7 will also have such a description.

According to the present invention, the selection corresponding to the wishes and needs of the driver or user is now made by actuating a control element according to the present invention. This actuation causes a processor of the entertainment device according to the present invention to analyze the data currently being played back for such features, and then to use the feature so obtained to search for other data that also has this feature. This is accomplished according to the present invention by a Like-It button or an equivalent control element.

The term data is used here in the meaning of audio and video data on recording media or received via radio signal. Furthermore, it is possible to search and play back other multimedia data using the entertainment device according to the present invention.

The communication device according to the present invention is usable for any infotainment system, i.e. not only for car radios, but also for home receivers or portable entertainment devices. When the user is using the device, he can actuate the control element according to the present invention when information or entertaining content is presented to him which he wishes in principle. That results then in only two different functionalities:

1. The operating element acts as a query-by-example device. That is, if content is presented that the user likes the user can press the control element. The attached content descriptions, such as MPEG7 files, are then used in order to search in the current radio program and all other currently available content via the Internet, CDs, MPEG3 files, DVDs, radio, television and other services via cellular radio or broadcast radio for content that is similar to the content currently being presented. The results of this search are then either automatically prioritized and presented sequentially after the current content ends, or are listed as options for the user to choose. In the motor vehicle, for safety reasons, the first variant is preferred. Naturally, the search results are constantly updated during the presentation, since the time element plays a role. For example, in the case of broadcast applications the time sequence cannot be changed. In principle, this query-by-example may be used for all services or contents, or only for individual ones, for example only for music. As long as this control element is enabled, only the content conforming to the desired model is presented. If one presses the control element another time, the favorite station or favorite CD is again played. Alternatively, it is also possible that the most recently tuned-in radio station or the most recently played CD begins to play.

2. A Like-It button or Nice button is also used to adapt and expand an existing driver profile. If the user is presented with content that he likes, he can inform the system, for example by prolonged pressing or by pressing twice, that the descriptive data for this content, i.e. the MPEG7 metafiles, should be incorporated into his profile. The metafiles may either augment or replace already existing data. The method of taking the descriptive data into account may therefore be prescribed by a profile management system in any desired manner. After the descriptive data has been taken into account, the user may receive an acoustic and/or visual confirmation.

In principle, either both functionalities or only one of the two may be implemented by a control element according to the present invention.

FIG. 1 contains a schematic representation of the entertainment device according to the present invention. An entertainment device 1 according to the present invention has a control element 2 according to the present invention, labeled Like-It, i.e. a Like-It button, additional control elements 3 and 4 for adjusting the volume or choosing the station, and a display field 5. In addition, entertainment device 1 according to the present invention is connected by cable to a speaker 6.

At the moment the user is listening to the radio station SWR2, which is indicated in display field 5 by its station designation. Now a user would like to listen to a station similar to SWR2, and to that end presses Like-It button 2. The processor of the entertainment device according to the present invention then searches for comparable stations and either displays them in the display field or plays them in sequence. By pressing control element 2 again it is then possible for example for the user to definitely choose a station. It is also possible to have a list of the available stations shown in display field 5, and the user selects an appropriate station by pressing control elements. It is further possible for this selection to be copied into a user profile, to enable accommodating these wishes of the user in the future.

Figure 2:
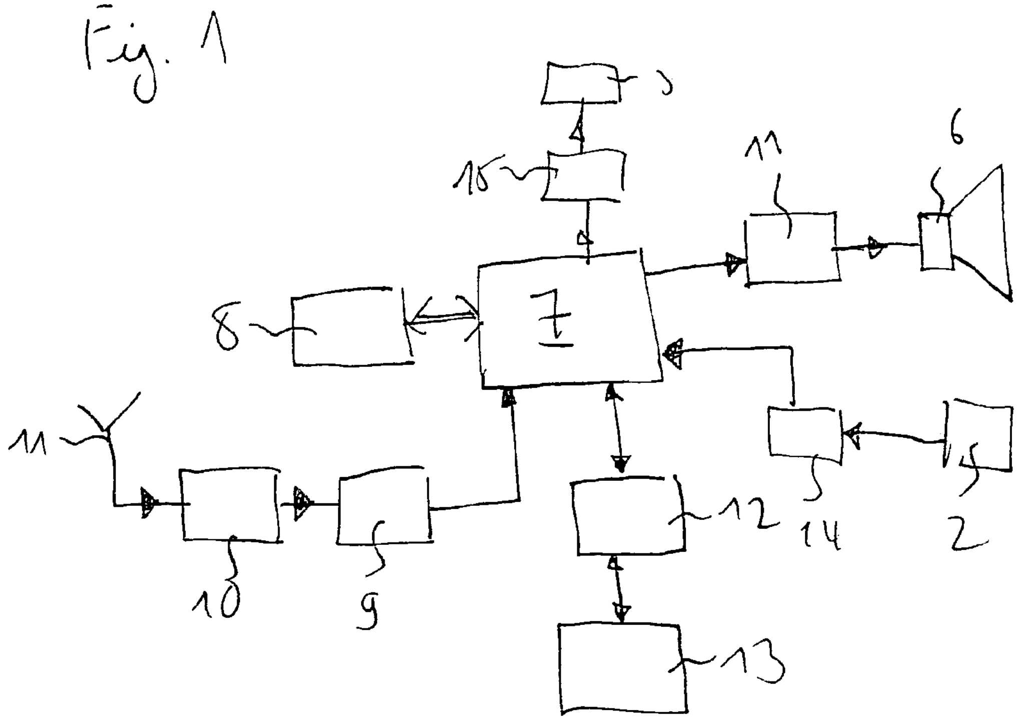
FIG. 2 shows a block diagram of the entertainment device according to the present invention.

FIG. 2 shows a block diagram of communication device 1 according to the present invention. A processor 7 is connected via a first data input/output to a memory 8, which is used for temporary storage of data. Processor 7 is connected via a second data input/output to a signal processor 12, which is connected in turn to a drive for recording media 13. Drive 13 may be a minidisk drive or a CD drive. Other recording media such as a chip card are also possible, however. A data input connects processor 7 to a digital unit 9, which processes a data stream from a high-frequency receiver 10. High frequency receiver 10 has an antenna at an input for receiving radio signals. Alternatively, it is possible instead of a broadcast receiver to have a radio receiver such as a cellular radio device or a cable-linked receiver such as a cable television receiver or a cable modem. Processor 7 is connected via a data output to an audio amplifier 11, which operates speaker 6. Through a second data input, processor 7 is connected to a signal processor 14, to which control element 2 according to the present invention is connected in turn.

Instead of button 2 as the control element, it is also possible to use a voice-activated controller or other similar control elements.

As described above, when data that he likes is played, a user will actuate control element 2, so that processor 7 searches in the broadcast signals that are being received by antenna 11 for comparable data, or also searches through a recording medium in drive 13 to see if it has comparable data. If it finds any, they are played back on display 5 or over speaker 6.

The feature analysis by processor 7 in the data currently being played back is concentrated, in the case of digital data, on the existing accompanying description, such as the metafile in the case of MPEG7. For analog data, it is possible that features may be assigned to the corresponding data played back either by a stored program guide or by a directory. Processor 7 is thus enabled to find correspondingly equivalent data and offer them to the user.

Along with the evaluation of a description for the data currently being played back, it is also possible to perform a data analysis that distinguishes voice from music and different types of music.

The entertainment device according to the present invention may be a car radio, a broadcast radio receiver for home use, or a portable radio receiver. In addition, it may be a playback device such as a video recorder or some other playback device for a data medium.

An entertainment device according to the present invention may also have a buffer memory for the data to be played back, which buffers already played-back data, possibly with a description, in order to be able to perform the feature analysis on this data as well, so that the user may also have equivalent data searched for at the end of a piece of music.

The duration or frequency of actuation of the control element according to the present invention determines how long the entertainment device according to the present invention searches for data which is equivalent to the data currently being played back.

A refinement of the entertainment device according to the present invention contains the provision that simultaneously with the search for the equivalent data, the data currently being played back is stored by actuating the control element, in order for example to expand a music collection. An appropriate buffer memory and the description accompanying the data make it possible to determine the beginning and end of the data, so as to be able to store a complete piece of music with the help of the buffer memory.

What is claimed is:

1. An entertainment device comprising:

a processor for processing content programs of broadcast data streams;

means for at least one of visual and acoustic playback of the content programs; and a control element, an actuation of the control element causing the processor to determine at least one characteristic feature of a first content program currently being broadcast as part of a first broadcast data stream and being played back, wherein the processor uses the at least one characteristic feature to search for a second content program that has the at least one characteristic feature and which is being broadcast in a second broadcast data stream concurrent to the broadcast of the first content program, and wherein the means for playback plays back the second content program found by the processor.

2. The entertainment device according to claim 1, wherein the processor uses the at least one characteristic feature to modify a user profile.

3. The entertainment device according to claim 1, wherein the means for playback outputs the second content program as part of a list.

4. The entertainment device according to claim 2, wherein the means for playback outputs feedback about a modification of the user profile.

5. The entertainment device according to claim 1, wherein the processor performs the search for the second content program, depending on at least one of a duration of actuation and a frequency of actuation of the control element.

6. The entertainment device according to claim 1, wherein the entertainment device stores the first content program currently being played back when the control element is actuated.

7. The entertainment device of claim 1, wherein the means for playback plays back the second content program immediately after the first content program ends.

8. The entertainment device of claim 1, wherein the first content program is at least one of a broadcast radio song and a broadcast television program.

9. The entertainment device of claim 1, wherein the processor uses the at least one characteristic feature to search for a plurality of other content programs that have the at least one characteristic feature, and wherein the means for playback prioritizes and plays back the plurality of other content programs sequentially after the first content program ends.

10. The entertainment device of claim 1, wherein the processor updates search results for the second content program during the course of the playback of the first content program.

11. An entertainment device comprising:

a processor for processing content programs of data streams including at least one of a broadcast data stream and a local data stream;

means for at least one of visual and acoustic playback of the content programs; and a control element, an actuation of the control element causing the processor to determine at least one characteristic feature of a first content program of a first data stream currently being played back, wherein the processor uses the at least one characteristic feature to search for a second content program that has the at least one characteristic feature and which is available for playback concurrent to the playback of the first content program, and wherein the means for playback plays back the second content program found by the processor.

12. The entertainment device according to claim 1, wherein the processor uses the at least one characteristic feature to modify a user profile.

13. The entertainment device according to claim 1, wherein the means for playback outputs the second content program as part of a list.

14. The entertainment device according to claim 1, wherein the means for playback outputs feedback about a modification of the user profile.

15. The entertainment device according to claim 1, wherein the processor performs the search for the second content program depending on at least one of a duration of actuation and a frequency of actuation of the control element.

16. The entertainment device according to claim 1, wherein the entertainment device stores the first content program currently being played back when the control element is actuated.

17. The entertainment device of claim 1, wherein the means for playback plays back the second content program found by the processor immediately after the first content program ends.

18. The entertainment device of claim 1, wherein the first content program is at least one of a song and a television program.

19. The entertainment device of claim 1, wherein the processor uses the at least one characteristic feature to search for a plurality of other content programs that have the at least one characteristic feature, and wherein the means for playback prioritizes and plays back the plurality of other content programs sequentially after the first content program ends.

20. The entertainment device of claim 1, wherein the processor updates search results for the second content program during the course of the playback of the first content program.

* * * * *